United States Patent [19]

Knavish

[11] Patent Number: 4,919,698
[45] Date of Patent: Apr. 24, 1990

[54] AVOIDANCE OF NICKEL SULFIDE STONES IN A GLASS MELTING OPERATION

[75] Inventor: Leonard A. Knavish, Plum Borough, Pa.

[73] Assignee: PPG Industries, Inc., Pittsburgh, Pa.

[21] Appl. No.: 369,450

[22] Filed: Jun. 21, 1989

[51] Int. Cl.[5] .............................................. C03B 5/16
[52] U.S. Cl. ..................................... 65/134; 65/135; 65/136
[58] Field of Search ........................ 65/134, 135, 136

[56] References Cited

U.S. PATENT DOCUMENTS

| | | | |
|---|---|---|---|
| 1,955,451 | 4/1934 | Blau | 65/136 |
| 2,277,678 | 3/1942 | Borel | 65/136 |
| 2,281,408 | 4/1942 | Borel | 65/136 |
| 2,561,818 | 7/1951 | Peyches | 65/136 |
| 3,530,221 | 9/1970 | Penberthy | 65/DIG. 4 |
| 3,811,858 | 5/1974 | Ernsberger et al. | 65/135 |
| 3,811,859 | 5/1974 | Ernsberger | 65/135 |
| 3,811,860 | 5/1974 | Nier | 65/135 |
| 4,001,001 | 1/1977 | Knavish et al. | 65/337 |
| 4,227,029 | 10/1980 | Joseph | 13/6 |
| 4,433,995 | 2/1984 | Toussaint | 65/135 |
| 4,536,205 | 8/1985 | Krumwiede | 65/135 |

Primary Examiner—Joye L. Woodard
Attorney, Agent, or Firm—Dennis G. Millman

[57] ABSTRACT

Nickel sulfide stones are avoided in a glass melting operation by electrolytically maintaining oxidizing conditions near the bottom of the upstream portion of a melting furnace at a location upstream from the establishment of a spring zone.

8 Claims, 2 Drawing Sheets

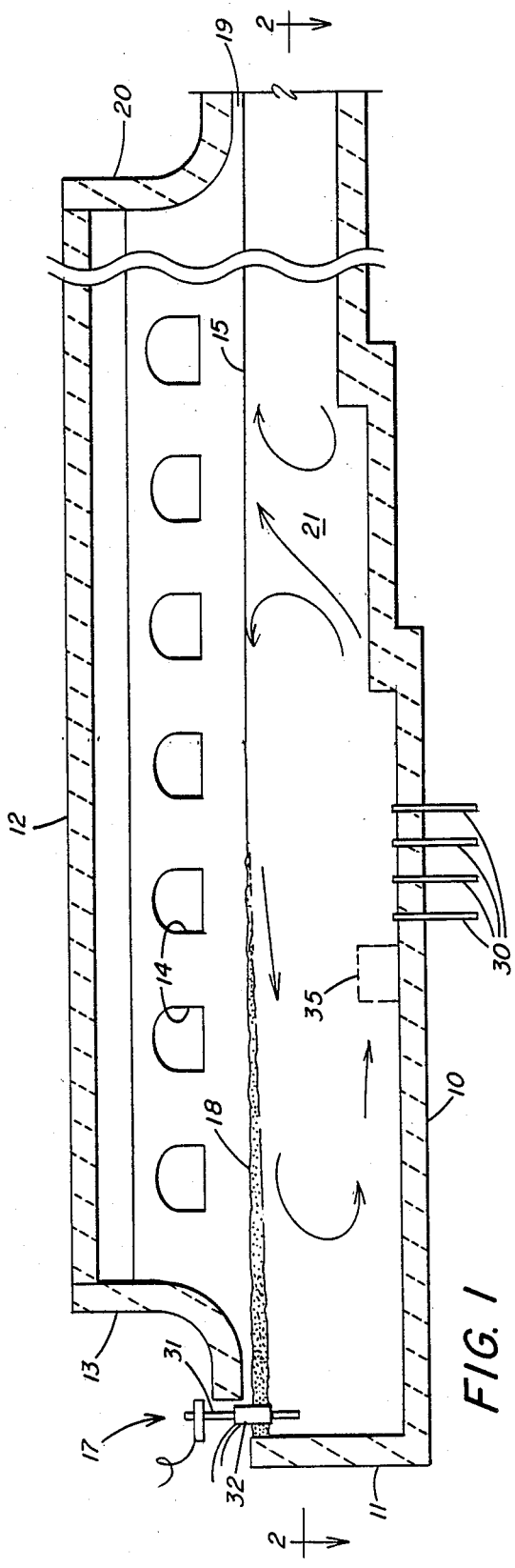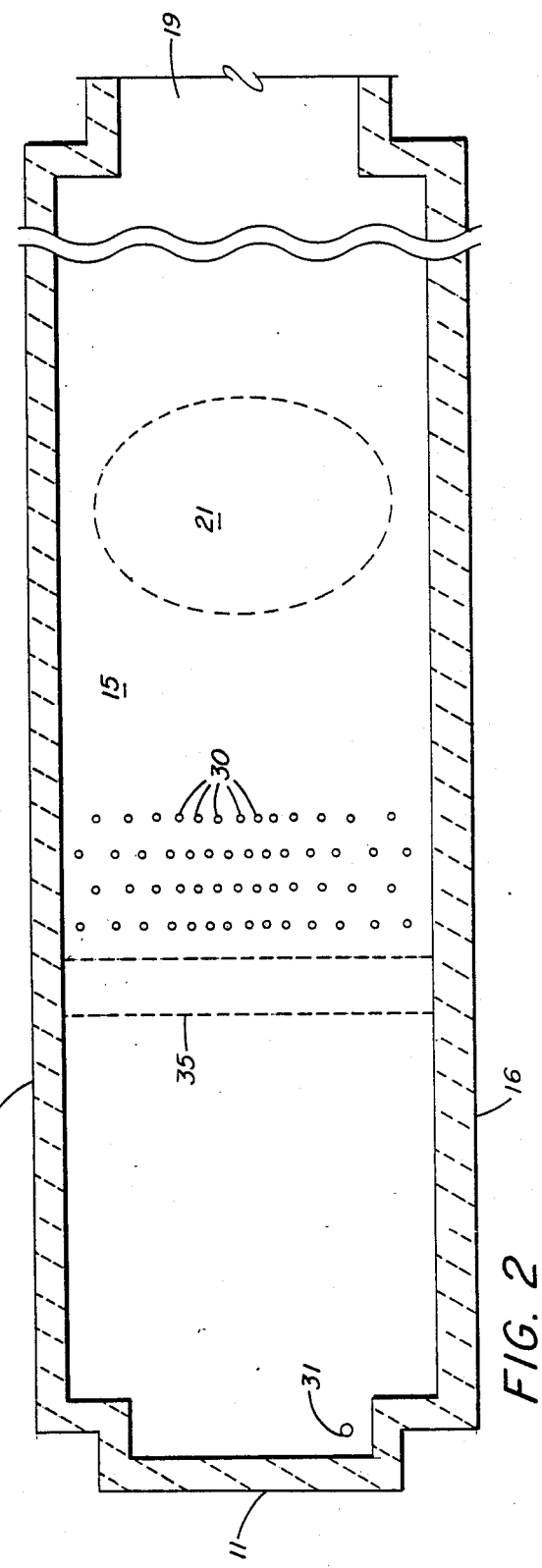

AVOIDANCE OF NICKEL SULFIDE STONES IN A GLASS MELTING OPERATION

BACKGROUND OF THE INVENTION

Small particles of nickel sulfide (NiS) usually known as nickel sulfide "stones" sometimes occur in glass and result in severe degradation of the glass quality. Nickel sulfide stones are usually too small to be seen and are very difficult to be detected by optical inspection means. Their negative effect on glass products is a result of the large difference between the coefficient of thermal expansion of nickel sulfide and that of glass. A change in temperature of a glass product, such as a glass sheet installed in a building or vehicle, that includes a nickel sulfide stone can cause intense, localized stresses to be created in the vicinity of the stone which can be of sufficient magnitude to fracture the sheet. This problem is particularly acute in tempered glass. Nickel sulfide stones also undergo slow phase changes which create local stresses. Because it is difficult to detect the presence of nickel sulfide stones in glass, and because their effects may not be exhibited until long after the glass sheet has been installed, prevention of nickel sulfide stones is an important objective for glassmakers.

The most straightforward approach to avoiding nickel sulfide stones is to prevent any source of nickel from entering the glass melting furnace. But trace amounts of nickel can appear as naturally occurring impurities in the raw materials used for making glass. Also, the common presence of nickel in stainless steel alloys used in equipment associated with the raw material mining and handling and in other machinery associated with a glass melting operation can lead to the inadvertent introduction of small amounts of nickel into a glass melting furnace even when strenuous efforts are made to avoid its deliberate introduction.

It would be desirable if formation of nickel sulfide stones could be prevented in the output from a glass melting furnace in which trace amounts of nickel may be present, and it is to this objective that the present invention is directed.

The prior art that may be considered to most closely resemble the present invention are those that deal with electrolysis of glass, but none of these teaches the prevention of nickel sulfide stones and none discloses an arrangement that would inherently produce that result. Passage of electrical current through molten glass in a melting furnace is a common practice for the purpose of assisting the heating of the glass. Conventionally, alternating current is used for this purpose, and therefore no electrolysis of the glass is involved. A few proposals have been disclosed for using direct current electrolysis for specialized purposes.

In U.S. Pat. Nos. 3,811,858 (Ernsberger et al.) and 3,811,859 (Ernsberger) electrolysis is used to create oxygen bubbles to enhance the rising convection current known as the "spring zone." To yield that effect the anodes (26) are located directly under or in the spring zone and the cathodes (28) are located on the floor of the furnace upstream from the anode in both of these patents. These locations are inappropriate for preventing nickel sulfide stones in accordance with the discoveries of the present invention.

A similar arrangement is shown in U.S. Pat. No. 4,433,995 (Toussaint). The anodes (17, 18) are located in the spring zone or downstream therefrom while the cathodes (13, 14, 15, 16) are located near the batch inlet for the sake of assisting the melting of the batch. These electrode locations would not achieve the results of the present invention.

U.S. Pat. No. 1,955,451 (Blau) uses electrolysis to separate a glass melt into two compositionally different fractions after melting is completed.

U.S. Pat. No. 3,530,221 (Penberthy) discloses the imposition of a direct current component onto an alternating current electric melting circuit for the sake of preventing corrosion of an electrode.

In U.S. Pat. No. 2,561,818 (Peyches) the walls of a glass melting vessel are disclosed to be preserved by applying a charge to the wall itself.

U.S. Pat. No. 4,227,029 (Joseph), based on the conventional belief that direct current is undesirable in a glass melting operation, discloses an arrangement for minimizing direct current components in an alternating current melting circuit.

U.S. Pat. Nos. 2,277,678 and 2,281,408 (both Borel) show positive and negative signs on electrodes in the drawings, but otherwise describe conventional electric melting principles consistent with the use of alternating current. No electrolysis is mentioned, and the relationship of the electrodes to the glass currents is not disclosed.

SUMMARY OF THE INVENTION

The present invention reduces the occurrence of nickel sulfide stones in glass by electrically maintaining oxidizing conditions in a region of the melting furnace prone to the formation of nickel sulfide. Under oxidizing conditions nickel sulfide in molten glass reacts to form nickel oxide, which is harmless. Most glass, particularly flat glass, is melted under oxidizing conditions. Therefore, it is somewhat surprising that nickel sulfide is formed under these conditions. The basis for the present invention is the recognition that a relatively stagnant layer of glass in a relatively reduced condition is present at the bottom of a melting furnace in the region between the batch inlet end and the spring zone. Nickel sulfide, which is twice as dense as molten glass, and metallic debris tend to collect in this relatively stagnant layer, thereby contributing to its reduced condition and providing sources of nickel from which additional nickel sulfide may form. The main body of molten glass is usually sufficiently oxidizing that most nickel sulfide stones would not survive if a sufficient residence time were provided in the furnace. It appears that the stagnant bottom layer is not sufficiently affected by the major convective flows of the molten glass to prevent the localized reducing conditions from existing in spite of the oxidized condition of the bulk glass. It is theorized that at the downstream end of this stagnant bottom layer, the upwardly rising spring zone currents lift some of the reduced, nickel sulfide containing material from the bottom and carry it into the flow stream moving toward the outlet of the furnace. This tendency may be augmented by bubbles that may form due to locally increasing temperature. Because of the relatively short flow path of some portions of this material through the spring zone to the outlet, it is believed that some of the nickel sulfide that may occasionally be present in these portions may not have sufficient residence time in the oxidized glass to completely decompose.

The solution provided by the present invention is to electrically impose oxidizing conditions near the bottom of the melting furnace in a least a portion of the region between the inlet end and the spring zone so as to prevent the presence of reducing conditions that would sustain or create nickel sulfide stones. This is carried out by imposing a direct current field on the molten glass with an anode or anodes in or near the bottom of the furnace. The amount of current involved is very small compared to electric heating means, and is insufficient to produce significant bubbling due to electrolytic reactions. The location of the anodes is important for the objectives of the present invention.

Preferably, most or all of the stagnant layer between the inlet and the spring zone is subjected to the oxidizing influence of the anodes so that conditions for forming nickel sulfide are avoided throughout that region. This may entail an array of anodes throughout the bottom region in which the reduced condition exists. Alternatively, the anodes may be spread over a smaller area, with the anodes sufficiently far upstream from the spring zone to afford adequate distance (and therefore time) for the electroytically produced oxidizing condition to act on any nickel sulfide in the bottom layer before it reaches the spring zone. If the anodes were to be located in or under the spring zone there would not be sufficient contact time between the oxidized portions and the reduced material. Therefore, anodes of the present invention are outside the spring zone.

BRIEF DESCRIPTION OF THE DRAWINGS

FIG. 1 is a vertical cross-section through a typical cross-fired, end-fed, glass melting furnace showing circulation flow patterns of the molten glass and the locations of the electrodes in accordance with one embodiment of the invention.

FIG. 2 is a plan view of the bottom of the furnace of FIG. 1 showing an example of an arrangement of electrodes in accordance with the invention.

DETAILED DESCRIPTION

Figure 3:
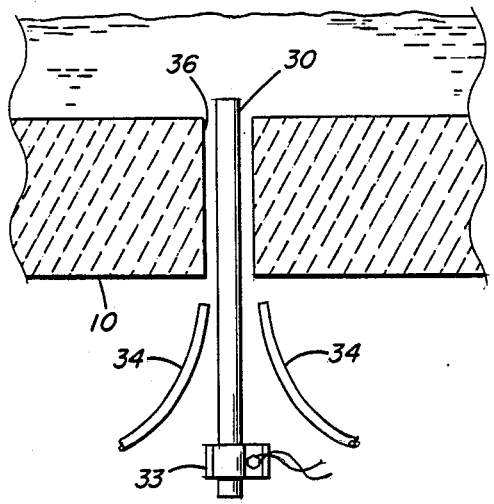
FIG. 3 is an enlarged view of a typical electrode mounting arrangement in the bottom of a furnace in accordance with one embodiment of the invention.

The glass melting furnaces to which the present invention relate are characterized by an inlet end at which raw glass batch materials are deposited onto a pool of molten glass held in the furnace and a generally opposite outlet end from which a product stream of molten glass is withdrawn from the pool. A specific embodiment of the invention will be described in the context of a common type of glass melting furnace in which the primary source of heat for melting is a plurality of flames extending transversely above the molten glass pool from ports in the side walls. It should be understood that other configurations of glass melting furnace are also commonly used and may also benefit from the present invention if a stagnant, reduced layer of glass is a cause of nickel sulfide stones persisting through the melting process.

Referring to FIG. 1, the typical glass melting furnace depicted includes a refractory basin bottom wall 10, basin inlet end wall 11, an arched roof 12, a suspended back wall 13, and a plurality of side firing ports 14. The number of ports may vary; typical flat glass furnaces usually having five to eight ports on each side. The basin of the furnace contains a pool of melting glass 15. Side basin walls 16 are shown in FIG. 2. Batch materials are fed onto the pool 15 through an inlet opening 17 and form a layer or batch cover 18 that melts as it progresses into the furnace. Molten glass passes from the furnace through an outlet opening 19 at an exit end of the furnace partly defined by an exit end wall 20.

The circulation currents in the pool of molten glass 15 are shown in FIG. 1. The presence of relatively cold batch material at the inlet end of the furnace and the shielding of the pool of glass from the overhead flames by the layer of batch 18 cause downward convection currents in the inlet region of the pool. The hottest region in the molten glass tends to be located downstream from the end of the batch layer 18, opposite the last r next-to-last port 14. The high temperatures in this region 21 known as the "spring zone" or "hot spot" yield rising convention currents in the pool. The combination of the rising and descending convention currents produces a circulation cell in the region upstream from the spring zone 21 which, as viewed in FIG. 1, moves in a generally counter-clockwise direction, with flow in the upper portion moving in a upstream direction (i.e., toward the inlet 17) and flows in the bottom portion moving in the downstream direction. Downstream from the spring zone a circulation cell rotating in the opposite direction may be present.

The present invention need not depend upon any particular theory, but the following theories may provide a better understanding of the operation of the invention. The velocity of flow is substantially lower near the basin bottom. Therefore, a stagnant layer of glass can exist near the bottom of furnace upstream from the spring zone, portions of which may move slowly along the bottom toward the spring zone. Additionally, products of erosion of the refractory basin walls or other areas of the furnace settle to the bottom of the furnace. As a result of this contamination, the bottom layer of glass can become more viscous than the bulk glass, which exacerbates the stagnation of this layer. Zirconia and alumina products of erosion react to form zirconium and aluminum silicates at the bottom of the furnace. This formation of silicates reduces the availability of silica in the bottom layer, and as a result the redox condition of the glass in the bottom layer is relatively reduced. The reducing environment in this layer tends to stabilize the existence of any nickel sulfide present. It is this stagnant layer that is dealt with by the present invention so as to substantially preclude sustaining of nickel sulfide stones.

In accordance with the present invention, oxidizing conditions are provided in the stagnant layer near the furnace bottom upstream from the spring zone by applying direct current to the molten glass pool, with the anode in the stagnant layer. The anode may take a variety of forms such as one or more plates, bars, or rods extending horizontally on the furnace bottom, but an arrangement preferred for the sake of ease of installation and replacement entails a plurality of rods 30 extending vertically through the furnace floor. The anode rods 30 need project only a short distance above the furnace bottom (e.g., about 1 to 4 centimeters) or their ends may be flush with the bottom. The anodes are preferably arranged in an array adapted to provide a widely dispersed supply of oxygen in the stagnant material that is susceptible to creeping forward into the spring zone. The array may consist of a plurality of rows as shown in FIG. 2, which is convenient for coordinating the anode placement with the support structure of the furnace, but is not an essential feature of the invention. To provide better coverage, the anodes in each row are offset from the anodes in the adjacent rows in the example shown in FIG. 2. There may be more flow in the center region than near the side walls, in which case it may be preferred to space the anodes more closely in the center than near the sides as shown in FIG. 2. The choice of the number and spacing of the anodes is a matter of balancing optimization and practicality. Optimum performance would be approached with a large number of closely spaced anodes. Costs and the inconvenience of drilling a large number of holes will in most cases lead to use of a smaller number than the optimum. Specific minimum numbers will depend upon the degree to which the stagnant layer is in a reduced condition, local molten glass velocity, and the extent to which freedom from nickel sulfide is to be assured. For the sake of general guidance in typical situations, a single transverse row of anodes would preferably be spaced apart no more than one meter, and more preferably no more than one half meter to yield an appreciable effect on nickel sulfide stones. In a typical two dimensional array of anodes, the spacing may preferably be such as to provide at least one anode per square meter, most preferably at least one anode per one half square meter. In a specific embodiment the anodes within each of four rows were spaced no more than 1 foot (0.3 meters) apart, and the rows were spaced apart about 3 feet (2.7 meters). In a typical furnace producing about 500 to 700 tons of glass per day, the total number of anodes to be significantly effective may be expected to be on the order of fifteen to fifty.

The location of the anodes 30 is an important aspect of the present invention. Their location should be sufficiently far upstream from the spring zone 21 to permit decomposition of nickel sulfide after being exposed to the oxidizing conditions created by the anodes and before entering the relatively rapid currents of the spring zone. This will vary from one furnace to another. Preferably the anodes are located so as to provide some variability. Locating the anodes too far upstream reduces the amount of residence time in an oxidizing condition for satisfactory oxidation of some large stones. Anodes in the spring zone would not be effective because the oxidizing effect would not be concentrated in the stagnant layer but would be rapidly dissipated in the mainstream currents there. In that case stones would be likely to enter the major furnace flow streams without being subjected to the enhanced oxidizing environment provided by the present invention. It may be advantageous to extend the array to effectively cover substantially the entire bottom region between the inlet end wall and the spring zone. Upstream oxidation may have drawbacks, however, if traces of tin are present in the glass, which, if oxidized to stannous oxide while in the bottom region, could lead to accelerated corrosion of the refractory bottom. In that event, it may be preferred for the array of anodes to be located within the downstream half of the bottom region between the inlet end and the spring zone.

Figure 4:
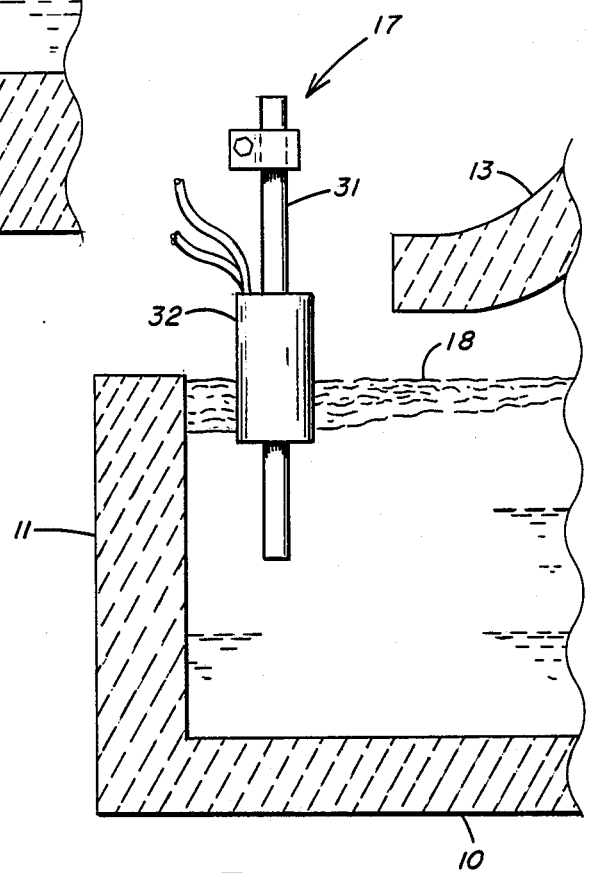
FIG. 4 is an enlarged view of the inlet region of a furnace showing details of a cathode installation in accordance with one embodiment of the invention.

A cathode 1 is immersed in the molten glass pool at a location spaced from the bottom region being oxidized so as to complete the electrical circuit. Preferably the cathode is in the upper half of the pool of glass. A convenient arrangement is to mount the cathode in the inlet opening 17 as shown in FIG. 4. More than one cathode may be provided, but a single cathode is generally sufficient. The cathode 31 may be held in position by a water-cooled, annular, electrode holder 32 partially immersed into the molten glass, whereby a cathode made of graphite will be protected from oxidation. The principal effect of the reducing reaction at the cathode is to reduce small amounts of sodium oxide to sodium which is readily re-oxidized by oxygen from the atmosphere.

Referring now to FIG. 3, details of a typical installation of one of the anodes 30 in the furnace bottom 10 may be seen. Connection to the positive terminal of a direct current power source is provided by means of a connector clamp 33. Undue oxidation of the anode is prevented by a purging stream of non-oxidizing gas (e.g., nitrogen) from one or more tubes 34 directed toward the bottom end of the bore 36 through which the anode extends. The minimal penetration of the anodes into the molten glass permits the strength of the anodes to be minimal. Accordingly, the diameters of the anodes and the bores through the furnace bottom may be considerably less than for typical electric heating electrodes. Diameters of one to two inches (2.5 to 5 centimeters) have been found suitable for the anodes. The minimal exposure of the anodes to the corrosive action of the molten glass also permits the use of relatively inexpensive electrode materials such as iron. A layer of ferrates may form on the anodes, which would retard their erosion, but the iron anodes may be considered sacrificial. The amount of iron that would be introduced into the glass is not sufficient to be considered a contaminant for most glass. The anodes may be periodically raised to compensate for any erosion. Monitoring the voltage-current relationship will indicate the need for raising the anodes.

An optional feature depicted in FIG. 1 is the provision of a barrier 35 across the bottom of the furnace. The barrier 35 may serve to impede movement of metallic debris along the bottom toward the spring zone. By confining at least a portion of the heavy contaminants to the region upstream from the anodes 30, the chances are lessened of re-contaminating glass after it has been subjected to the oxidizing treatment of the anodes.

The amount of electric current to be passed through the glass by the electrode system of the present invention will depend upon the degree to which corrective action is needed in a particular furnace. In general, the current is insufficient to produce a significant bubbling effect due to oxygen production at the anodes. As an example, in a furnace producing 500 to 700 tons of glass per day, it is contemplated that the total oxygen production at all of the anodes need not exceed five grams per hour, and in a typical case may be in the order of one to three grams per hour. Larger amounts of current may be used without significant bubble generation, but may consume more electrical power without a corresponding increase in benefit. Excessive amounts of bubbling may be detrimental if the resulting agitation causes the reduced material on the bottom to be prematurely carried into the spring zone. Since the total current will be distributed over a number of anodes, a large number of anodes will permit a larger total current. Average current per anode may be on the order of 0.1 to 0.5 amps in a typical example, but more or less current may be used as required. In a specific example, current levels of the example above were sustained with a potential of about twenty volts. The voltage required in a specific case is determined by the resistance of the glass which in turn depends on the temperature of the glass in the vicinity of the anodes and the glass composition. Relative to joule effect heating, the electric power consumption of the present invention is very small, in one example being on the order of 2 watts.

The spring zone is generally spaced from the side walls of the furnace, so relatively stagnant areas may also be present alongside the spring zone, near the bottom of each side wall. Therefore, in some cases it may be desirable for a portion of the oxidizing treatment of the present invention to be directed toward material that may be moving laterally from these side regions toward the spring zone. It should be understood that the use of the terms "upstream" and "downstream" as used herein should be interpreted in a manner consistent with this optional treatment of laterally moving material.

The invention has been described with reference to specific examples, but it should be understood that the invention, as defined by the claims, may encompass other variations and modifications as would be apparent to those of skill in the art.

I claim:

1. In a method of melting glass wherein relatively cold feed material is fed onto a pool of melting glass at an upstream end of a furnace, molten glass is withdrawn at a downstream end of a furnace longitudinally spaced from the upstream end, and heat for melting is provided to the furnace whereby a spring zone of rising glass currents is established in the pool at an intermediate location spaced from the upstream end and the downstream end, the improvement comprising applying direct current to the pool of molten glass by means of at least one anode and at least one cathode, with the at lease one anode being located closely adjacent to the bottom of the pool of melting glass in the region of the furnace upstream from the spring zone of rising currents, so as to maintain oxidizing conditions in the bottom region of the pool upstream from the spring zone of rising currents to suppress the presence of nickel sulfide stones in the glass.

2. The method of claim 1 wherein the at least one anode comprises an array of anodes in the bottom region of the pool of melting glass.

3. The method of claim 2 wherein the anodes extend upwardly from below and into the pool of melting glass.

4. The method of claim 1 wherein the amount of direct current passed through the glass is insufficient to produce a significant bubbling effect.

5. The method of claim 2 wherein the location of the array of anodes is spaced from the upstream end of the furnace.

6. The method of claim 3 wherein the anodes extend upwardly into the melting glass no more than 4 centimeters.

7. The method of claim 2 wherein the anodes are comprised of iron.

8. The method of claim 1 wherein the glass is soda-lime-silica glass.

* * * * *